United States Patent [19]
Wilkinson

[11] Patent Number: 5,586,519
[45] Date of Patent: Dec. 24, 1996

[54] BALE FEEDER

[76] Inventor: Everett Wilkinson, 8124 Snowdell, Bonne Terre, Mo. 63628

[21] Appl. No.: 336,877

[22] Filed: Nov. 9, 1994

[51] Int. Cl.⁶ .................................................. A01K 1/10
[52] U.S. Cl. .................................................... 119/60
[58] Field of Search ............................... 119/58, 59, 60

[56] References Cited

U.S. PATENT DOCUMENTS

| | | | |
|---|---|---|---|
| 2,830,558 | 4/1958 | Pierre | 119/60 |
| 4,020,794 | 5/1977 | Nethery | 119/60 X |
| 5,158,040 | 10/1992 | Martin | 119/60 X |
| 5,189,985 | 3/1993 | Brady et al. | 119/60 |

*Primary Examiner*—Thomas Price
*Attorney, Agent, or Firm*—Dennis A. Bennett

[57] ABSTRACT

There is disclosed a feeder capable of dispensing cylindrical bales of hay to livestock. The feeder has two side frames connected to a bottom frame. The side frames are connected by a front side rail and a rearward side rail. Chains are spaced to hold the hay inside the feeder while allowing the livestock to reach the hay.

16 Claims, 2 Drawing Sheets

BALE FEEDER

BACKGROUND OF THE INVENTION

1. Field of the Invention

This invention relates to an animal feeder in particular it relates to a feeder capable of dispensing cylindrical bales of hay to livestock.

2. Related Art

Round bales of feed material are commonly used to feed livestock. Some of the most common feeders that are designed to receive a cylindrical bale of feed are simply a plurality of circular rails which are connected to form a cylindrical body of a size to fit around the periphery of the round bale of hay.

For example, U.S. Pat. No. 4,706,609 to Delichte discloses a livestock feeder that has an inner frame for supporting the round bale of hay and an outer frame having bars spaced sufficiently to allow an animal to pass its head between the bars to reach the hay. Another example includes U.S. Pat. No. 5,058,531 to Akins which discloses a feeder having a skirt which is of a generally cylindrical shape for surrounding the round bale of hay. Other types of feeders include U.S. Pat. No. 5,158,040 to Martin and U.S. Pat. No. 5, 067,442 to Schilling which are basically rectangular in design.

SUMMARY OF THE INVENTION

There is disclosed a novel animal feeder comprising;

a first and second side frame each frame having a top rail and bottom rail with front and rearward ends, a front side rail with a top and bottom connecting said forward end of said top rail to said forward end of said bottom rail and a rearward side rail with a top and bottom connecting said rearward end of said top rail to said rearward end of said bottom rail;

a bottom frame having a front bottom cross rail and rearward bottom cross rail and at least one support rail connecting said front bottom cross rail to said rearward bottom cross rail, said rearward bottom cross rail connecting said bottoms of said rearward side rails of said first and second side frames, said front bottom cross rails connecting said bottoms of said front side rails of said first and second side frames, said bottom rails of said first and second side frames are closer together than said top rail of said first and second side frames and said top rails are far enough apart to accommodate a round bale of hay;

a plurality of side vertical chains, spaced such that an animal may reach said hay through said spacing, affixed to said top rail of said first side frame, extending and affixed to said support rail and said side vertical chains further extending and affixed to said top rail of said second frame, a top cross rail connecting said top of said rearward side rail of said first side frame to said top of said rearward side rail of said second side frame; and a gate including at least one chain affixed and extending from said front side rail of said first side frame to said front side rail of said second side frame wherein at least one end of said chain(s) of said gate end is removable affixed to allow hay to be inserted into said hay feeder.

It is an object of the present invention to provide an animal feeder capable of dispensing one or more round bales of hay.

The disclosed feeder has the following advantages:

1. The feeder can be easily transported, in that the fully assembled feeder can be easily fitted into the back of a standard pickup or the feeder can be easily dragged to an area where the feeder will be used.
2. It is not complicated in its design and relatively inexpensive to produce.
3. Can be loaded with hay without moving the feeder and can be loaded by common farm equipment like a 3 point hitch or a front end loader.
4. The claimed feeder holds the hay off the ground and its open nature allows for less spoilage since air is allowed all around the hay.
5. The claimed feeder can be easily assembled by someone not skilled in equipment construction and can do so with simple hand tools.

DETAILED DESCRIPTION

Figure 1:
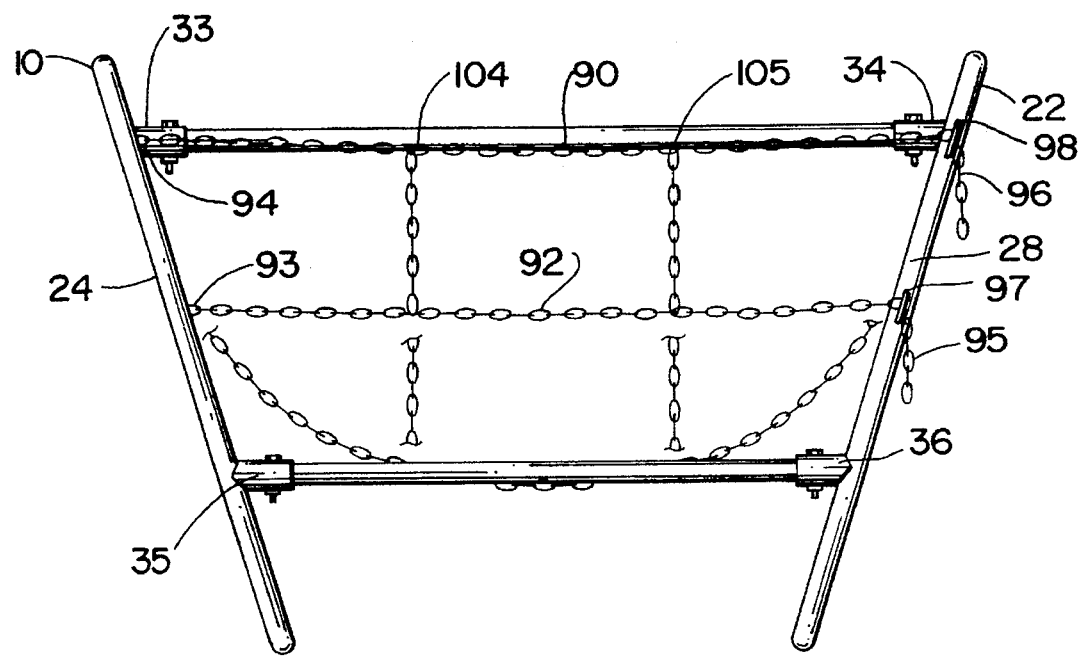
FIG. 1 is a front view of the feeder with the chain gate closed.
Figure 2:
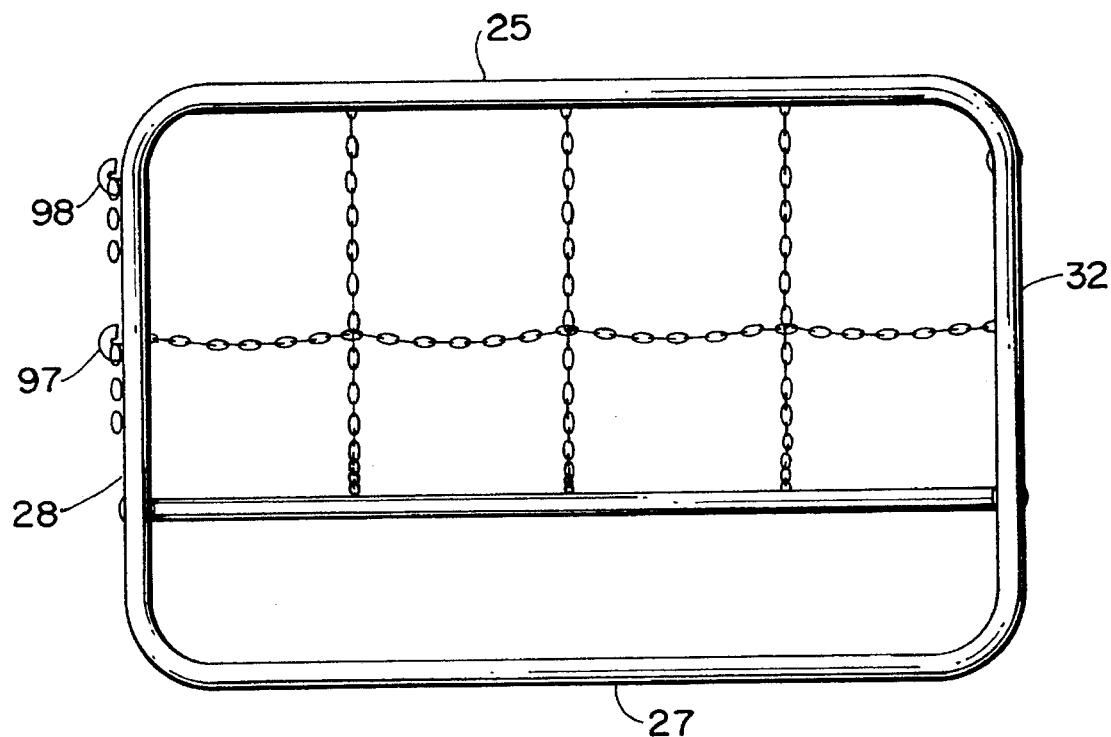
FIG. 2 is a side view of the feeder.
Figure 3:
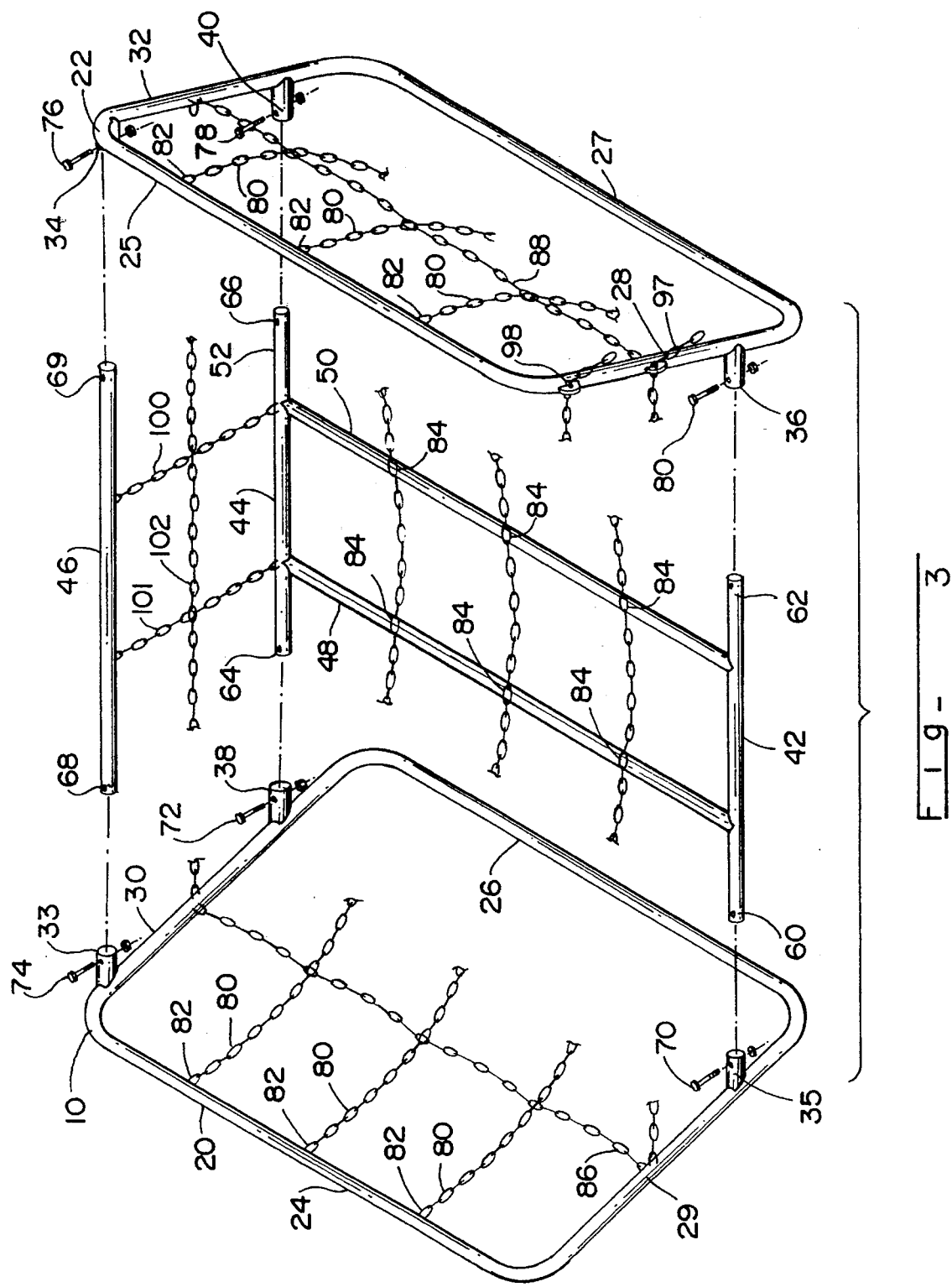
FIG. 3 is an exploded view of the "breakdown" version of the present feeder.

Referring to FIG. 1 and FIG. 3, the feeder 10 includes two side frames 20 and 22. In the preferred embodiment the side frames 20 and 22 are made by bending 2 20'×2" x11 gage iron, or aluminum tubing with 6" radius corners to produce top rails 24 and 25 and bottom rails 26 and 27 that are about 74" long and front side rails 28 and 29 and rearward side rails 30 and 32 that are about 48"0 high. The two ends of the tubing of each of the side frames 20 and 22 are then welded together. Alternatively the side frames 20 and 22 can be made by welding two 10' pieces of tubing together in a similar manner.

In the preferred embodiment the side frames 20 and 22 have top bosses 33 and 34 welded to the top rearward sides 30 and 32 about 6' down from top rail 24 and 25, two front bottom bosses 35 and 36 are welded about 15" inches up from the bottom rails 26 and 27 and two rearward bottom bosses 38 and 40 are welded about 15 inches up from bottom rails 26 and 27. The bosses are made from 2⅜"×11 gage tubing 4½" long cut on 30 degree×45 degree on one end. The difference in the cut on the bosses will allow sides 20 and 22 to be tilted outwardly from the top but still allow front bottom cross rail 42 and rearward top and bottom cross rails 44 and 46 to be substantially horizonal. On the ends of bosses 33, 34, 35, 36, 38, and 40 holes are drilled to allow to retain bolts 70, 72, 74, 76, 78 and 80 to be received. These bolts are preferably 3½" and ½" and are cadmium plated.

The front bottom cross rail 42 and rear bottom cross rail 44 and support rails 48 and 50 form bottom frame 52. In the preferred embodiment the bottom frame 52 includes support rails 48 and 50 but a singular support rail could be used. The support rails 48 and 50 are welded to cross rails 42 and 44. On the ends on cross rails 42 and 44 holes 60, 62, 64 and 66 are drilled. The holes should be large enough to receive bolts 70, 72, 78 and 80. Top cross rail 46 has holes drilled in each end 68 and 69 that are capable or receiving bolts 74 and 76.

Attached to top rails 24 and 25 chains 80 attached by means of a chain connector preferably a U shaped hook 82 which is welded to the bottom of top rails 24 and 25. In the preferred embodiment a removable fastener or cold shut connects the chain 80 to the chain connector 82. This will allow the feeder 10 to be easily assembled since the chain connector 82 will be welded on the bottom of the top rails 24 and 25 at the factory and the chain can be attached when the feeder 10 is assembled.

The chains 80 are sufficient in length to extend from top rail 24, to the support rails 48 and 50 and further extending to top rail 25. The chain 80 is affixed to chain connectors 82 preferably by means of a cold shut or a link fastener, three chains are preferred in this embodiment and are spaced so as to provide about 18 inch openings. In the preferred embodiment the chain is allowed to have at least about 5 inches of slack everywhere. The chains 80 are affixed to support rails 48 and 50 in the same manner as they are attached to the top rails.

Attached in the inside of side frames 20 and 22 are chains 86 and 88. Chains 86 and 88 are connected to side rails 29 and 30, 28 and 32 in the similar manner as chain 80. They are also attached to chains 80 when they intersect.

Chains 90 and 92 are connected to front side rails 28 and 29. Ends 93 and 94 are attached like chain 80. Ends 95 and 96 are attached by lock fastens 97 and 98. Lock fasteners 97 and 98 are welded to front side rail 28. The lock fastener is "J" shaped. When welded to front side frame 28 it will engage the flat side of chain 90 and 92. Other types of fasteners will also work so long as it removablly holds chains 90 and 92 in place. Chain ends 93 and 94 need not be attached to front side rail 29 as described above but can have the same attachment means as 95 and 96. Attachment means 97 and 98 allow chains 90 and 92 to act as a gate to allow the feeder to be loaded with hay. If all the ends have the attachment means 96 and 97 the feeder can be opened in either direction. Attached to chains 90 and 92 are chains 100 and 105 using a chain fastener.

Attached to rear cross rails 44 and 46 are chains 100 and 101. Chain 102 is attached to rear side rails 30 and 32 at about their midpoint and attached to chains 100 and 101. The chains are connected as are chains 80. When all the chains are fully attached they form a net to secure the hay within the feeder 10.

The chain used is preferably 520 lbs test and plated to resist rusting. The term "chain" refers to any chain like material which will function in the same manner like straps, fetters, cables and/or the like.

In the preferred embodiment the feeder 10 can be easily assembled and disassembled. Cross rails 42, 44 and 46 are connected to side frames 20 and 22 by inserting their ends into the bosses as shown in FIG. 1. The holes in the cross rails 42, 44, and 46 are aligned with the holes in the bosses. Then a bolt is inserted thru the holes and a lock nut is put on the other end of the bolt and tightened.

Other embodiments are possible off the same similar design. In the preferred embodiment the bottom frame is removablly attached to the side frames 20 and 22 but it can be welded to provide greater stability and strength. Additional chain can be added to increase or decrease the openings in the feeder. The top rear cross rail 46 can be replaced with a chain and attached at both ends like chain 80 or the rear of the feeder 10 can have the same type of gate as the front of the feeder 10 thereby eliminating the top cross rail all together and allowing the feeder 10 to be loaded from the front or back.

In another embodiment, the feeder 10 can be extended in length to allow the feeder to hold two bales of hay. Additional middle side rails will need to be added in about the midpoint of the feeder 10. An additional cross rail will be added in the same manner as the rear and front cross rail to connect the middle crosses rails of the first and second side frames 20 and 22. The support rails will be welded to the middle cross rail.

The side frames, bottom frame 52 and the attached chains correspond to about the diameter of a normal cylindrical bale of hay. The bale of hay is cradled in the feeder 10 and as the hay is consumed the size of the bale is reduced down inside of the feeder 10. The feeder 10 is designed so that the top rails 24 and 25 are about as far apart as the diameter of a bale of hay. The bottom rails 26 and 27 are closer together than the top rails 24 and 25 and correspond to about the top of the round bale of hay. This allows the hay that is presented to the livestock to be about the same until there is very little hay left in the feeder 10. It also keeps larger animals further away from the midpoint of the feeder 10 as compared to smaller animals. In addition, a new bale of hay can placed on top of the old hay thereby making the livestock consume the old feed before being able to start on the new.

It is well known in the art that livestock, especially cows, do not eat neatly. The main manner in which waste occurs is that the cow tears at a bale of hay, by gripping a tuft of hay by the mouth. The cow draws the tuft of hay out of the bale, and aside, before starting to eat the mouthful of hay. Inevitably, a proportion of the hay in the tuft falls from the cow's mouth during this phase. This fallen hay is wasted because it is trampled by the cows and is accepted as an unfortunate but necessary fact in the feeding of cattle, being an inevitable consequence of the manner in which cows eat.

In testing this device, the above problem has been solved. In field testing, the feeder 10, it was noticed that cows would indeed drop portion of hay grabbed from the feeder. However, due to its novel design the cows were not able to trample the dropped hay because of the side frames tilt outward, calves feeding with the cows would retrieve the vast majority of the dropped hay since their smaller height allowed them to get closer to the midpoint of the feeder.

The feeder of the present invention is extremely simple as regards to its construction, and the feeder is tough and sturdy; it can be tipped on its side, for example, for transport purposes, and can be stacked and generally manhandled without being damaged.

Although dimensions have been quoted in the above description, it should be noted that the invention is not limited to the particular dimension given. The dimensions given are merely examples which have been found to be effective.

Since various modifications can be made in the invention as hereinabove described, and many different embodiments of same can be made within the spirit and scope of the claims without departing from such spirit and scope, it is intended that all matter contained in the accompanying specification shall be interpreted as illustrative only and not in a limiting sense.

What is claimed:

1. A bale hay feeder, comprising:

a first and second side fame each frame having a top rail and bottom rail both rails having a front end and rearward end, a front side rail with a top end and bottom end connecting said front end of said top rail to said front end of said bottom rail and a rearward side rail with a top end and bottom end connecting said rearward end of said top rail to said rearward end of said bottom rail;

a bottom frame having a front cross rail and rearward cross rail and at least one support rail connecting said front cross rail to said rearward cross rail, said rearward cross rail connecting said bottom end of said rearward said rails of said first and second side frames, said front cross rails connecting said front side rails of said first and second side frames, said bottom rails of said first and second side frames are closer together than said top rail of said first and second side frames and said top rails are far enough apart to accommodate a round bale of hay;

a plurality of said vertical chains, spaced such that an animal may reach hay through said spacing, affixed to said top rail of each of said first side frame and said second side frame, extending and affixed to said support rail;

a top cross rail connecting said top end of said rearward side rail of said first side frame to said top end of said rearward side rail of said second side frame; and a gate including at least one chain affixed and extending from said front side rail of said first side frame to said front side rail of said second side frame wherein at least one end of said chain is removably affixed to allow hay to be inserted into said hay feeder.

2. The feeder according to claim 1 further comprising at least one rearward vertical chain affixed to said top cross rail extending and affixed to said rearward bottom cross rail.

3. The feeder according to claim 1 wherein said bottom frame is removablly connected to said first and said second side frame by a plurality of bosses.

4. The feeder according to claim 1 wherein said bottom frame is connected to first and second side frame such that said bottom frame is above the ground to allow air to pass underneath.

5. The feeder according to claim 1 wherein said gate includes a top chain and bottom chain.

6. The feeder according to claim 5 further comprising at least one vertical chain connecting said top chain and said bottom chain.

7. The feeder of claim 1 wherein said bottom frame has two support rails connecting said front bottom cross rail to said rearward bottom cross rail.

8. The feeder of claim 1, further comprising:

a middle side rail connecting about the middle of said top rail of said first side frame to about the middle of said bottom rail of said first side frame;

a middle side rail connecting about the middle of said top rail of said second side frame to about the middle of said bottom rail of said second side frame; and a middle cross rail connecting said middle side rail of said first frame to said middle side rail of said second side frame.

9. A bale hay feeder, comprising:

a first and second side frame each frame having a top rail and bottom rail both rails having a front end and rearward end, a front side rail with a top end and bottom end connecting said front end of said top rail to said front end of said bottom rail and a rearward side rail with a top end and bottom end connecting said rearward end of said top rail to said rearward end of said bottom rail;

a bottom frame having a front cross rail and rearward cross rail and at least one support rail connecting said front cross rail to said rearward cross rail, said rearward cross rail connecting said bottom end of said rearward side rails of said first and second side frames, said front cross rails connecting said front side rails of said first and second side frames, said bottom rails of said first and second side frames are closer together than said top rail of said first and second side frames and said top rails are far enough apart to accommodate a round bale of hay;

a plurality of said vertical chains, spaced such that an animal may reach hay though said spacing, affixed to said top rail of each of said first side frame and said second side frame, extending and affixed to said support rail;

a top cross rail connecting said top end of said rearward side rail of said first side frame to said top end of said rearward side rail of said second side frame;

a gate including at least one chain affixed and extending from said front side rail of said first side frame to said front side rail of said second side frame wherein at least one end of said chain is removably affixed to allow hay to be inserted into said hay feeder; and a back gate including at least one chain affixed and extending from said rearward side rail of said first side frame to said rearward side rail of said second side frame.

10. A feeder according to claim 9 wherein at least one end of said chain of said back gate is removablly attached to allow hay to be inserted into the back of said feeder.

11. The feeder according to claim 9 wherein said front gate has a top and bottom chain and said back gate has a top and bottom chain.

12. The feeder according to claim 11 further comprising a vertical chain connecting said top and bottom chains of said front gate and a vertical chain connecting top and bottom chains of said back gate.

13. The feeder according to claim 9 wherein said bottom frame is removablly connected to said first and said second side frame by a plurality of bosses.

14. The feeder according to claim 9 wherein said bottom frame is connected to said first and second side frame such that said bottom frame holds said hay above the ground to allow air to pass underneath said hay.

15. The feeder of claim 9 wherein said bottom frame has two support rails connecting said front bottom cross rail to said rearward bottom cross rail.

16. The feeder of claim 9 further comprising;

a middle side rail connecting about the middle of said top rail of said first side frame to about the middle of said bottom rail of said first side frame;

a middle side rail connecting about the middle of said top rail of said second side frame to about the middle of said bottom rail of said second side frame; and a middle cross rail connecting said middle side rail of said first frame to said middle side rail of said second side frame.

* * * * *